H. W. WARNER.
AXES.
No. 181,227. Patented Aug. 15, 1876.
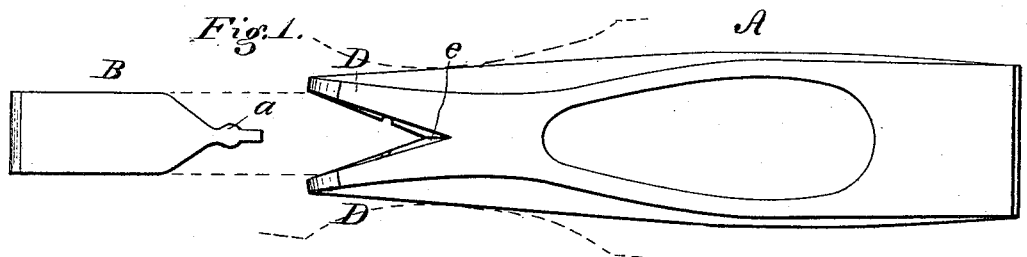
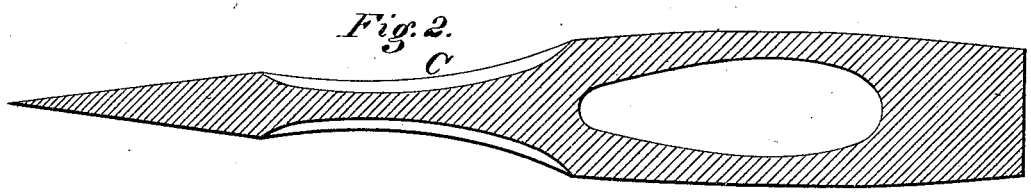
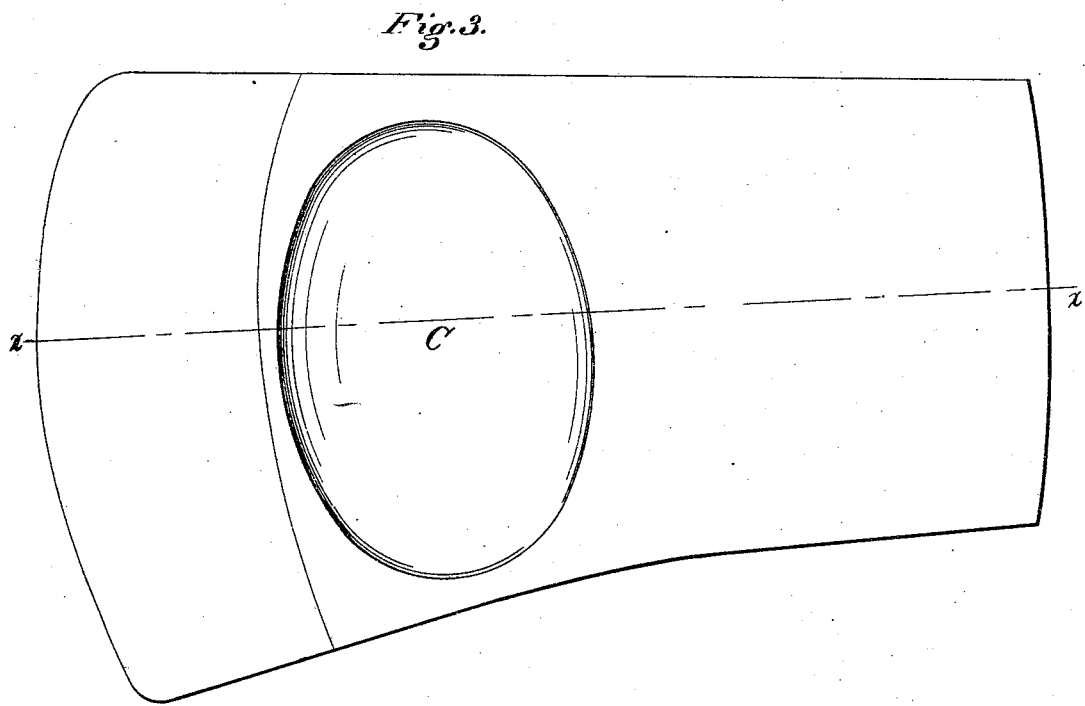
Witnesses:
Donn J. Twitchell.
Will W. Dodge.
Inventor:
H. W. Warner
by Dodge & Son
Attys.

UNITED STATES PATENT OFFICE.

HENRY W. WARNER, OF GREENFIELD, MASSACHUSETTS.

IMPROVEMENT IN AXES.

Specification forming part of Letters Patent No. 181,227, dated August 15, 1876; application filed June 15, 1876.

*To all whom it may concern:*

Be it known that I, HENRY W. WARNER, of Greenfield, in the county of Franklin and State of Massachusetts, have invented certain Improvements in Axes, of which the following is a specification:

My invention consists in a novel construction of axes, whereby the same are rendered more perfect, and their manufacture simplified and cheapened, as hereinafter more fully explained.

In the drawings, Figure 1 represents the poll and bit separate; Fig. 2, a longitudinal section on the line $x\ x$ of Fig. 3, and Fig. 3 a face view of the ax complete.

Heretofore it has been customary to form the weld by which the bit of the ax is joined to the poll partially by means of a trip-hammer, and partially by hand, the form of the ax being such as to render it impracticable to form the weld by means of a drop-press and dies. It is obvious that if the weld could be thus formed much time and labor would be saved, and the necessity of several heatings would be obviated.

It is to accomplish this object, and to produce an ax which shall offer little resistance in entering, which will not stick when driven into the wood, and which will allow the free escape of chips, that my present invention is designed.

In carrying out my invention, I first provide a poll, A, of the form shown in Fig. 1, the lower edge of which is divided, as shown, into two parts, the outer ends of which are forced apart, thus leaving a wedge-shaped space between them.

Next, I provide a bit, B, which is made of steel, and which has one edge drawn down to form a corresponding wedge shape, so that it may enter the cavity in the poll. This wedge has a rib or bead, $a$, formed on its faces, as shown. The inner faces of the parts D may be provided with recesses to receive the rib $a$; or the metal of the poll may be made to engage over it in the act of welding, as desired.

The wedge of the bit B being placed in the cavity of the poll A, the whole is placed in a drop-press, which press is provided with dies corresponding in form to the finished ax, each die corresponding to one side of the ax.

It will be observed, by reference to Figs. 2 and 3, that the form of the ax differs somewhat from that ordinarily in use, a cavity or depression, C, being formed in the sides of the same, and extending across nearly to the front and rear, and from a point just above the lower boundary of the weld to about the lower side of the eye. The dies are, consequently, of the form represented by one of the faces of the ax, or by the upper and lower faces of Fig. 2.

In order to form a perfect weld, it is necessary that the welding process should be commenced at the extreme bottom of the cavity in the poll, and that the edge of the steel bit and the iron of the poll should first be brought together and united at that point; and hence it is that, when the weld is effected by either a hand or a trip hammer, the blows are first delivered on a line across the face of the poll, directly over the apex of the cavity, as indicated by the letter $e$, Fig. 1. By this means the metals are firmly united at that point, thus preventing the possibility of there being any cavity or flaw left in the weld. At the same time, as the hammering is continued along toward the edge, the metal of the overlapping edges D is forced or drawn down over the steel still farther, and a solid and complete weld is thus formed at all points where the metals come in contact.

By using a die and drop convex on their faces, corresponding with the concavity in the sides of the ax, it will be seen that the metal is first operated upon at that point, the same as is now done by the hand process, the convex extremities of the dies on the opposite faces touching first at that point, as indicated by the dotted lines in Fig. 1, said lines indicating the outline of the dies across the center. As the dies approach each other the metal of the overlapping edges D is crowded or forced out still farther, the same as when drawn out by hand, and thus at a single heat, and by a single operation or blow, the welding is completed as perfectly as when done by hand, and at a great saving of time, fuel, and labor.

This construction, in addition to permitting the welding to be done in a drop-press, possesses several advantages over the ordinary construction, as the cavity or recess C permits the chips to escape freely, thus facilitating the entrance of the ax into the wood, while at the same time the ax, being thinner at the point where the depression is formed than immediately below, the wood will not come against the sides of the ax opposite said depressions, and, consequently, there will be much less resistance to it in entering than if it were made of constantly-increasing thickness. This is also an advantage in withdrawing the ax from the wood, for the reason that with this arrangement the wood is not forced so wide apart, and, consequently, does not hold the ax so firmly, as when made of the usual form.

The depression C may be made more or less deep, as desired; or, instead of a depression, a hole may be formed in its place.

I am thus enabled to form the weld and give the necessary shape to the ax all at one operation, and with but one heating, thus greatly reducing the labor and expense.

I am aware that a patent has been granted for an ax having a series of narrow grooves extending from the eye down on each side toward the point, and therefore I do not claim such; but What I do claim is—

As a new article of manufacture, an ax having the single concavity C formed on each of its sides, extending nearly across the same, substantially as shown and described.

HENRY W. WARNER.

Witnesses:
J. H. SANDERSON,
M. S. FELLOWS.